May 18, 1954  E. J. CARD  2,678,854
DRAWER SUSPENSION
Filed March 14, 1951  2 Sheets-Sheet 1
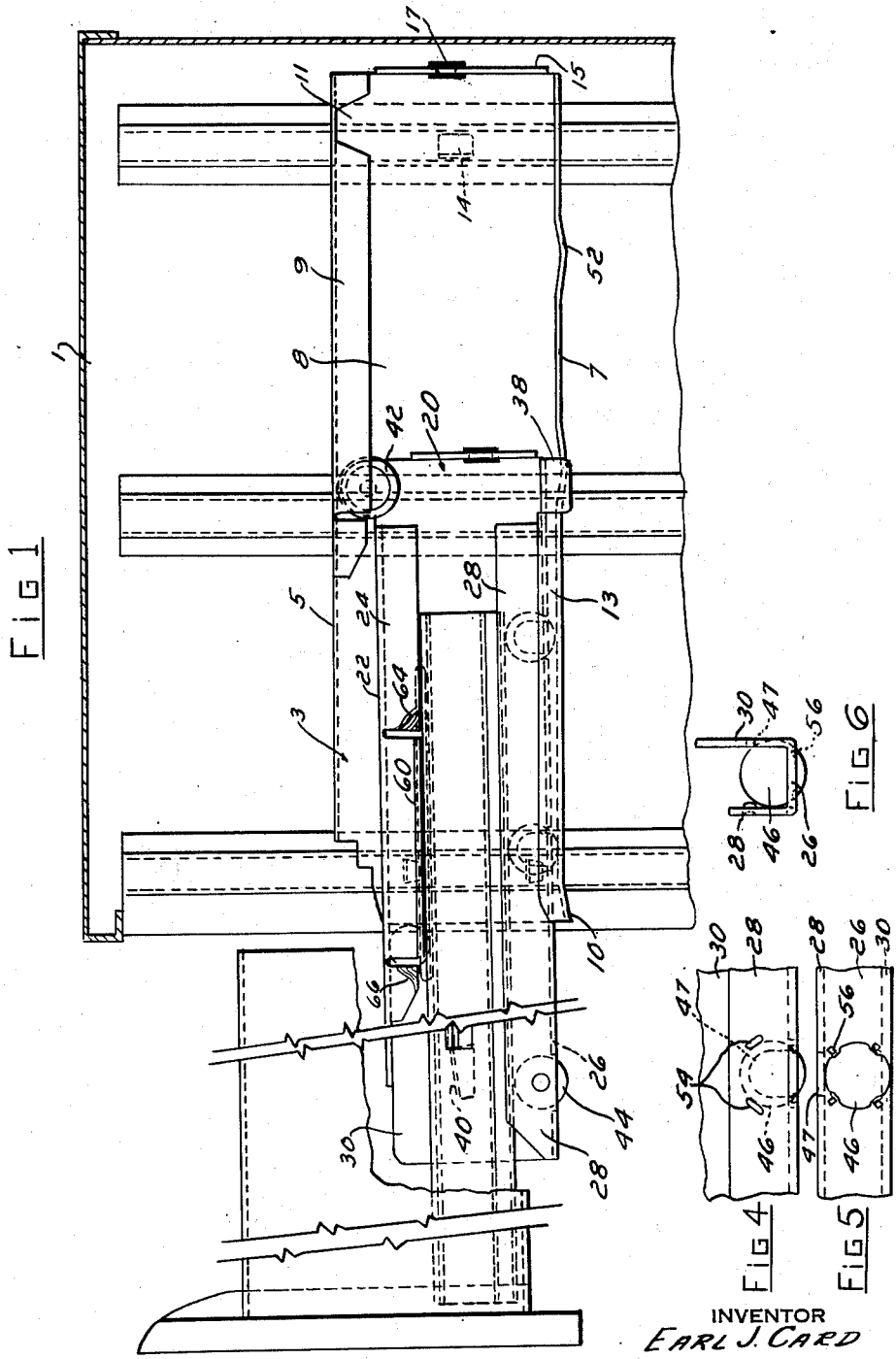
INVENTOR
EARL J. CARD
BY
ATTORNEY May 18, 1954 — E. J. CARD — 2,678,854
DRAWER SUSPENSION
Filed March 14, 1951 — 2 Sheets-Sheet 2
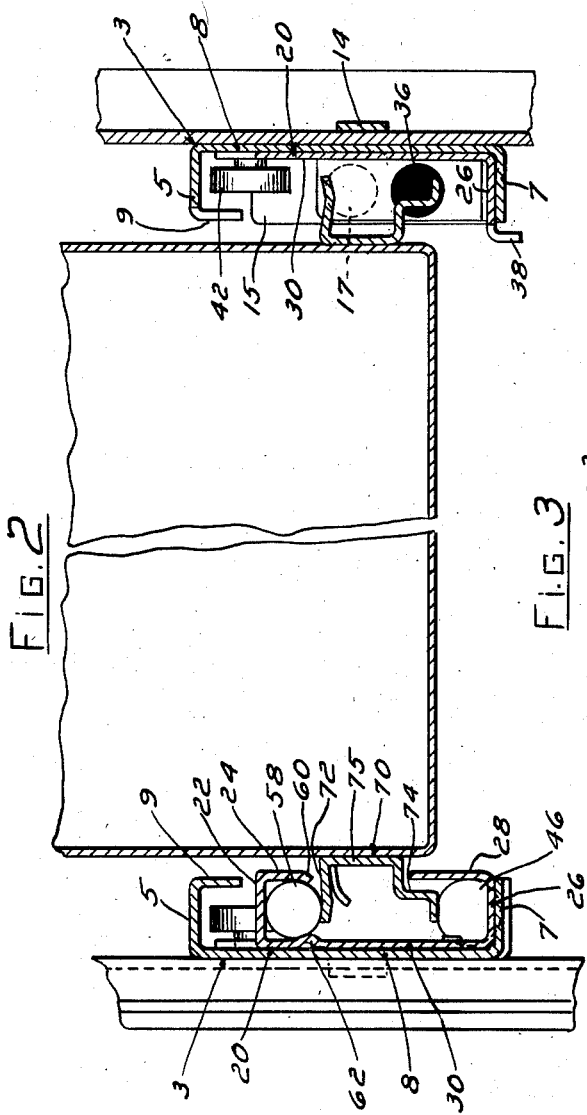
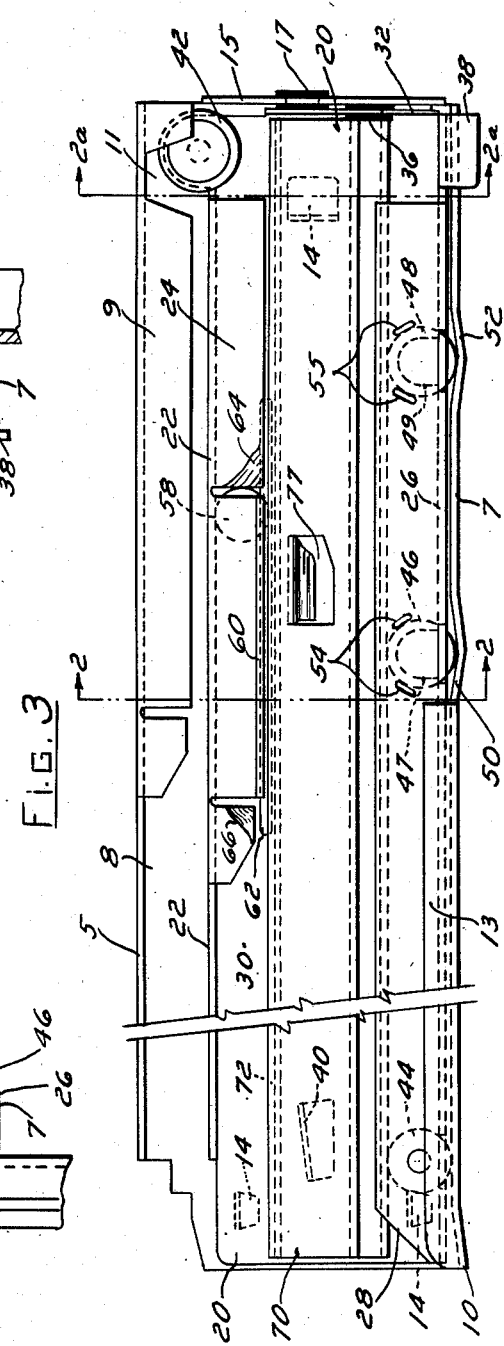
INVENTOR
EARL J. CARD
BY
ATTORNEY Patented May 18, 1954

2,678,854

UNITED STATES PATENT OFFICE 2,678,854

DRAWER SUSPENSION

Earl J. Card, Jamestown, N. Y., assignor to Security Steel Equipment Corporation, Avenel, N. J., a corporation of New Jersey Application March 14, 1951, Serial No. 215,444

6 Claims. (Cl. 308—3.8)

This invention relates to an improved extension suspension for slidable members, particularly suited to but not necessarily limited to suspensions for file drawers.

Such suspensions customarily consist of a stationary cabinet or case rail, a moving drawer rail, and a floating intermediate or neutral extension rail with either anti-friction rollers or bearing balls placed between the rails to permit substantially frictionless relative movement between the rails, case and drawer.

Attempts have been made in the past to reduce friction and the cost of manufacture by utilizing bearing balls in lieu of rollers. Such constructions, however, have not been wholly satisfactory in use, due to the tendency of the rails to rock laterally relatively to each other, upon the bearing balls, thus causing binds and undue wear as well as lessening the rigidity and firmness of the suspension as a whole. Furthermore, difficulties have been encountered in providing economical means for securing the bearing balls in place in the rails without weakening the latter.

According to this invention, an improved and more rigid and yet free rolling suspension is provided by utilizing a new combination of anti-friction rollers and bearing balls in conjunction with specially contoured rails and novel ball retaining means. Other inherent advantages and novel features, such as economy in construction and small space occupied, will be apparent to those skilled in the art from the following detailed description of this invention when read in connection with the accompanying drawings which purposely illustrate a portion of a file cabinet and drawer somewhat out of proportion, better to depict the novel features of this invention and in which Fig. 1 is a longitudinal vertical section through a portion of a file cabinet showing a drawer in open position;

Fig. 2 is a staggered and enlarged vertical transverse section, the left side being taken along line 2—2 of Fig. 3 and the right side being taken along line 2a—2a of Fig. 3;

Fig. 3 is an inside side elevation of one side suspension corresponding to a closed drawer position;

Fig. 4 is a detail side elevation of a portion of the neutral rail showing the manner of securing the bearing balls in place;

Fig. 5 is a bottom plan view of the same, and

Fig. 6 is an end view of the same.

While the invention is shown as applied to an extension drawer suspension of the independent neutral rail type to which the invention is particularly adapted rather than to the cradle type in which the neutral rails are coupled together, it will be apparent that the invention is applicable to both types. In the following description, the suspension for one side only of the drawer will be described and it will be understood that the parts are duplicated for the other side as is necessary and customary in this type of suspension.

Secured to each side of the cabinet or casing 1 is a case rail 3 channel-shaped in cross section and having a horizontal top flange 5, a parallel bottom flange 7, and a body or vertical connecting wall 8. The top flange 5 is formed at its rear half portion with a downwardly extending vertical retaining and strengthening lip 9 having a cut out notch 11, adjacent the rear end for permitting assembly and disassembly of the neutral rail, as will later be explained. The bottom flange 7 is dipped at its forward end at 10 to facilitate closing of the drawer and is provided at its forward half portion with an upwardly extending vertical retaining and strengthening lip 13. The body portion 8 is further provided at its forward and rear ends with struck out tongues 14 (Fig. 3) which serve as fastening means for securing the rail to the casing in the usual manner.

The rear end of wall 8 is flanged inwardly at 15 and carries a resilient rubber bumper 17 for engaging the rear end of the neutral rail when in fully closed position.

Sliding within the case rail is the floating neutral extension rail 20, also channel shaped in cross section having a top flange 22, the rear half portion of which is further flanged downwardly as at 24 to give strength to the rail, and a bottom flange 26 further formed with an upturned flange or lip 28 for the major portion of its length, for additional strength. The top and bottom flanges are joined by a vertical wall 30.

The rear end of wall 30 is flanged inwardly at 32 to engage the bumper 17 and to provide a support for a second bumper 36 positioned to engage the rear end of the drawer rail, when the drawer is closed. The rearmost portion of lip 28, instead of extending upwardly, is bent downwardly at 38 to engage the rear edge of the upturned lip 13 and limit the forward movement of neutral rail 20. The forward end of the wall 30 of the neutral rail is struck inwardly to provide a limiting stop tongue 40 positioned to engage a portion of and limit the forward movement of the drawer rail, as will be explained.

Fixed to the upper rear end of wall 30 is a flat surfaced bearing roller 42, rotatable about a horizontal axis and projecting above the surface of flange 22, the latter flange and lip 24 being omitted at the extreme end portion of the rail to permit mounting of the roller at this point. Roller 42 engages the under surface of top flange 5 of the case rail 3 whenever the drawer is moved from closed position to provide substantially frictionless movement between the neutral rail and the case rail at this point whenever the drawer is open. Whenever it is desired to remove the neutral rail, roller 42 may be passed through the cut out notch 11. At the lower forward end of the neutral rail there is a second flat surfaced roller 44 rotatable about a horizontal stud extending between and secured in the wall 30 and lip 28. Roller 44 projects through the bottom flange 26 and engages the top surface of flange 7 of case rail 3 and is guided onto said surface by the dipped end 10.

In addition to the rear upper thrust bearing roller 42 and forward lower thrust bearing roller 44, both of which are of substantial width, the extension rail carries a main propeller bearing ball 46 which projects through openings in the wall 30 and in the lower flange 26 at approximately the center of the rail and engages the inner surface of wall 8 and the upper surface of the lower flange 7 of the case rail 3. Propeller ball 46 is so positioned that it just starts to travel down the dipped end 10 when the drawer is fully open and tends to retain the drawer in open position. The extension rail is also provided with a second or auxiliary balancing bearing ball 48 which also projects through the wall 30 and lower flange 26, at a point adjacent the rear end of the extension rail and serves to carry the weight of the drawer as well as assisting in propelling the extension rail forwardly at half the rate of the drawer movement as is customary in this type of suspension. The lower flange 7 is provided with two slight depressions 50 and 52, underlying balls 46 and 48 respectively when the extension rail is in rear or closed drawer position, tending to hold the rail and the drawer in closed position.

In prior suspensions it has been customary to provide apertures in the vertical side wall and in the vertical side flange or lip, as well as in the bottom flange for receiving the bearing balls and permitting them to project and engage the surfaces of the case rail and reduce friction in relative movement between the two rails. It has been found, however, that this mutilation of the neutral rail materially weakens it and reduces its carrying strength and life. According to this invention (see particularly Figs. 4, 5, and 6) the bottom flange 26 is apertured at two points just sufficiently to permit insertion of each of the balls 46 and 48. In addition, the vertical wall 30 is also provided with two apertures 47 and 49 which are in line with and in the illustrated embodiment connect with the apertures in the lower flange and are of less diameter than the diameters of the balls 46 and 48 respectively but are of sufficient size to permit the balls to project therethrough and engage the wall 8. The upturned lip 28 instead of being apertured has two pair of inwardly struck blisters 54 and 55 opposite each aperture 47 and 49 and overlying each ball. These blisters cooperate with the apertures 47 and 49 and retain the balls against longitudinal movement and in position projecting through the apertures in the lower flange. The balls 46 and 48 are prevented from falling outwardly through the apertures in the lower flange by swaging the edges of the apertures at four points as at 56 to swell the metal slightly at these points, sufficiently only to prevent escape of the balls but insufficiently to prevent rotation.

The extension, or floating rail, is also provided with an upper traveling bearing ball 58 which lies within the channel or cage formed by wall 8 of the upper flange 22 and lip 24. The latter is bent inwardly slightly along its lower edge as at 60 and a longitudinal rib 62 is depressed inwardly from the outer wall 8 to complete the cage and to retain the ball 58 within the longitudinal channel. The ball 58 is retained longitudinally within its channel and its movement therein limited by inwardly struck portions 64 and 66 (Figs. 1 and 3) of the depending lip 24. Ball 58 carries the upward thrust when the drawer and extension rail are outwardly extended and moves with the extension rail as it travels forwardly, that is, with the drawer in open position.

Sliding within the extension rail is the usual movable drawer rail 70 fastened to the drawer in any suitable manner, and also generally of channel shape in cross-section, having a horizontal upper flange 72 and a lower Z flange 74 connected by a vertical wall 75. The lower flange 74 bears on balls 46 and 48 as well as roller 44. The upper flange 72 bears upon ball 58 and is formed with a slight concavity, as can be seen in Fig. 2 which, in conjunction with the flat bearing surface of the lower flange on the flat surface roller 44, tends to prevent lateral rocking of the drawer rail. The flat bearing surface of the upper flange 5 engaged by the flat surfaced roller 42 has the same effect with respect to the neutral rail. In other words, the concavity of flange 72 cooperating with the curved surface of ball 58 and the flat bearing surfaces on the rolls 42 and 44 cooperating with the flat surfaces of flanges 5 and 74 respectively give stability and rigidity to the suspension, even though bearing balls 46, 48 and 58 are employed to minimize frictional engagement.

The vertical main wall 75 of the drawer rail is struck inwardly to provide a stop tongue 77 which engages the forward edge of the tongue 40 to limit the forward movement of the drawer which, however, can be raised at the forward end to disengage this contact, if it is desired to remove the drawer completely from the cabinet.

From the foregoing it will be seen that there has been provided a drawer suspension adaptable to either the independent or cradle type of floating extension rail suspension which employs a combination of rollers and bearing balls and rail flange constructions and bearing ball supports which result in minimized friction, economical construction, and yet rigidity of the tracks and firmness and stability of the suspension as a whole.

It will be obvious to those skilled in the art that minor variations in details of construction may be indulged in without departing from the spirit and scope of this invention as defined in the claims.

I claim:

1. In an extension drawer suspension having a case rail, a neutral extension rail having upper and lower flanges and a drawer rail upon each side of the drawer to be suspended, said case rails having flat surfaced upper and lower flanges, the combination of flat surfaced bearing rollers at the upper rear and lower forward ends of said neutral rails in position to engage said upper and lower flanges respectively of said case rails with a propeller bearing ball and a balancing bearing ball carried by each of said neutral rails in position to engage said lower flanges of said case rails and the bottom of their respective drawer rails and a traveling bearing ball carried by each of said neutral rails in position to engage the under surface of the upper flanges of said extension rails and the top surface of said drawer rails.

2. In an extension drawer suspension having a case rail, a neutral extension rail having upper and lower flanges and a drawer rail upon each side of the drawer to be suspended, said case rails having flat surfaced upper and lower flanges, and said drawer rails having concaved upper flanges, the combination of flat surfaced bearing rollers at the upper rear and lower forward ends of said neutral rail in position to engage said upper and lower flanges of said case rail respectively with a propeller bearing ball and a balancing bearing ball carried by each of said neutral rails in position to engage said lower flanges of said case rails and the bottom of their respective drawer rails and a traveling bearing ball carried by each of said neutral rails in position to engage the under surface of the upper flanges of said extension rails and the top surface of said concaved drawer rails.

3. In an extension drawer suspension having a case rail, a neutral extension rail, a drawer rail upon each side of the drawer to be suspended and bearing balls between said rails, each extension rail having an inner vertical wall, a lower horizontal flange, and a vertical wall or lip extending upwardly therefrom providing a channel for the reception of one or more of said bearing balls, said flanges being provided with an aperture to permit passage of a bearing ball therethrough, one of said vertical walls being provided with an opening therethrough adjacent the aperture in said flange and the other of said vertical walls being formed with two spaced inwardly projecting blisters, one upon each side of the ball, cooperating with said aperture in the other of said vertical walls to retain said ball against longitudinal movement in said channel.

4. In an extension drawer suspension having a case rail, a neutral extension rail, a drawer rail upon each side of the drawer to be suspended, and bearing balls between said rails, each extension rail having an inner vertical wall, a lower horizontal flange, and a wall or vertical lip extending upwardly therefrom providing a channel for the reception of one or more of said bearing balls, said flange being provided with an aperture to permit passage of a bearing ball therethrough, one of said vertical walls being provided with an opening therethrough adjacent the aperture in said flange and the other of said vertical walls being formed with two spaced inwardly projecting blisters, one upon each side of the ball, cooperating with said aperture in the other of said vertical walls to retain said ball against longitudinal movement in said channel, the edge of said aperture through said horizontal flange being swaged to prevent passage of said ball therethrough.

5. In an extension drawer suspension having a case rail, a neutral extension rail, a drawer rail upon each side of the drawer to be suspended, and at least one bearing ball between said rails, each extension rail having an inner vertical wall terminating in a horizontal flange and said latter flange terminating in a vertical wall or lip extending upwardly therefrom, said lip and inner wall forming a channel for the reception of one or more bearing balls, said flange having an aperture therein of sufficient size to permit passage of a bearing ball into said channel, one of said vertical walls having an opening therethrough in line with said aperture and the other of said walls being inperforate but being formed with an inwardly projecting blister upon each side of the ball and cooperating with the aperture in the other vertical wall to retain said ball against longitudinal movement in said channel, the edge of said aperture through said horizontal flange being swaged to prevent passage of said ball through said aperture.

6. In an extension drawer suspension having a case rail, a neutral extension rail, a drawer rail upon each side of the drawer to be suspended, and at least one bearing ball between said rails, each extension rail having an inner vertical wall terminating in a horizontal flange and said latter flange terminating in a vertical wall or lip extending upwardly therefrom, said lip and inner wall forming a channel for the reception of one or more bearing balls, said flange having an aperture therein of sufficient size to permit passage of a bearing ball into said channel, one of said vertical walls having an opening therethrough in line with and connecting with said aperture and the other of said walls being inperforate but being formed with an inwardly projecting blister upon each side of the ball and cooperating with the aperture in the other vertical wall to retain said ball against longitudinal movement in said channel, the edge of said aperture through said horizontal flange being swaged at spaced points to prevent passage of said ball through said aperture.

References Cited in the file of this patent

UNITED STATES PATENTS

| Number | Name | Date |
| --- | --- | --- |
| 2,157,611 | Jones et al. | May 9, 1939 |
| 2,346,167 | Jones et al. | Apr. 11, 1944 |
| 2,561,163 | Wolters | July 17, 1951 |

FOREIGN PATENTS

| Number | Country | Date |
| --- | --- | --- |
| 712,275 | France | Sept. 29, 1931 |